United States Patent [19]
Sherry et al.

[11] Patent Number: 5,987,484
[45] Date of Patent: Nov. 16, 1999

[54] DIGITAL FILTERING SYSTEM

[75] Inventors: Adrian Sherry, Dublin; Damien McCartney; Michael Byrne, both of Limerick, all of Ireland

[73] Assignee: Analog Devices, Inc., Norwood, Mass.

[21] Appl. No.: 09/056,228

[22] Filed: Apr. 7, 1998

Related U.S. Application Data

[62] Division of application No. 08/600,296, Feb. 12, 1996, Pat. No. 5,777,911.

[51] Int. Cl.$^6$ .................................................. G06F 17/10
[52] U.S. Cl. ............................................. 708/300; 708/316
[58] Field of Search ................................... 708/300, 313, 708/316; 331/17

[56] References Cited

U.S. PATENT DOCUMENTS

| | | |
|---|---|---|
| 3,755,750 | 8/1973 | Heberling .................. 328/167 |
| 4,506,233 | 3/1985 | Englund, Jr. ................ 331/17 |
| 4,771,249 | 9/1988 | Burch et al. ................ 331/17 |
| 5,301,134 | 4/1994 | Maruyama .................. 708/313 |
| 5,408,202 | 4/1995 | Shirazi et al. ................. 332/8 |
| 5,440,503 | 8/1995 | Maruyama ............... 708/300 X |
| 5,499,392 | 3/1996 | Grunwell .................. 455/260 |
| 5,539,355 | 7/1996 | Nakamura .............. 375/272 X |
| 5,796,757 | 8/1998 | Czaja ........................ 714/789 |

*Primary Examiner*—Tan V. Mai
*Attorney, Agent, or Firm*—Fish & Richardson P.C.

[57] ABSTRACT

A digital filtering system is fed by input signal and produces an output signal from either a relatively low bandwidth filter or a relatively wide bandwidth filter selectively in accordance with the time rate of change in the input signal. The output signal is produced by the relatively low bandwidth filter when the input signal is slowly varying and the output signal is produced by the relatively wide bandwidth filter when the input signal changes rapidly, after which the output is produced from the relatively low bandwidth filter when the input signal reverts to its more slowly varying characteristics.

5 Claims, 11 Drawing Sheets

DIGITAL FILTERING SYSTEM

This is a divisional of U.S. patent application Ser. No. 08/600,296, filed Feb. 12, 1996, U.S. Pat. No. 5,777,911.

BACKGROUND OF THE INVENTION

This invention relates generally to digital filtering systems and more particularly to digital filtering systems having a bandwidth which varies as a function of the time rate of change in an input signal fed to the digital filtering system.

As is known in the art, a certain class of filter design is a trade-off between the desire to remove noise accompanying an input signal and to produce an output signal which replicates the input signal itself. Thus, while a reduction in the bandwidth of the filtering system reduces noise, it also increases the response time of the filter to changes in the input signal. For example, in applications where there is a step change in the input signal, while a low pass filter will reduce any accompanying noise, as the bandwidth of the low pass filter is reduced, the filter will also increase or dampen the rise time of the output signal. One technique suggested in U.S. Pat. No. 3,755,750 to remove high frequency noise is with a filtering system which operates in one of two different modes. With such system, either the input signal is coupled through a low bandwidth filter, as when the input is slowly varying, or the low, or narrow, bandwidth filter is in effect by-passed, as when the input changes rapidly (i.e., when the input has the characteristics or a square wave or step).

Figure 9:
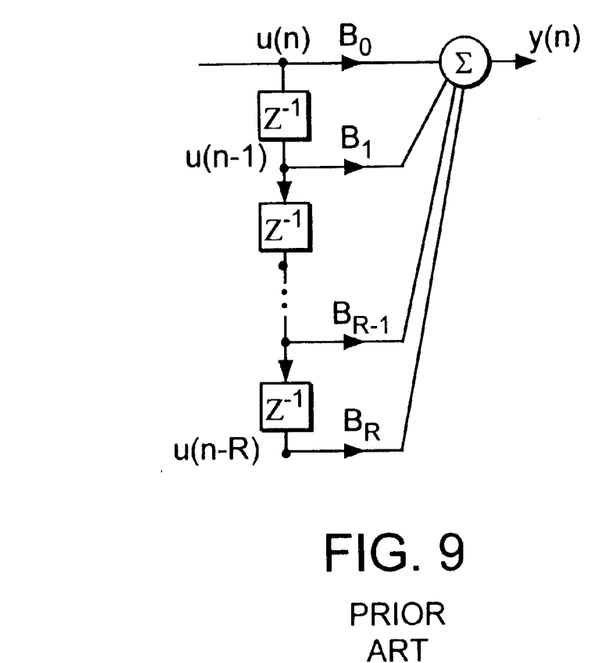
FIG. 9 is a block diagram of a Finite Impulse Response Filter according to the prior art.

As is also known in the art, digital filters are typically either Finite Impulse Response Filters (FIRs) or Infinite Impulse Response Filters (IIRs). FIG. 9 shows a block diagram of a typical FIR digital filter. The $Z^{-1}$ boxes represent delay, or storage elements, with the dots at the outputs of these boxes representing the stored value (state variable). The input is shown to pass through R delay elements. The outputs of these delay blocks and the current input are then multiplied by coefficients, $B_0$–$B_R$, before being summed at the output. Some of these coefficients may be zero. The output y(n) is given by $$Y(n) = B_0 \cdot u(n) + B_1 \cdot u(n-1) + B_2 u(n-2) + \ldots + B_R \cdot U(n-R)$$

Figure 10:
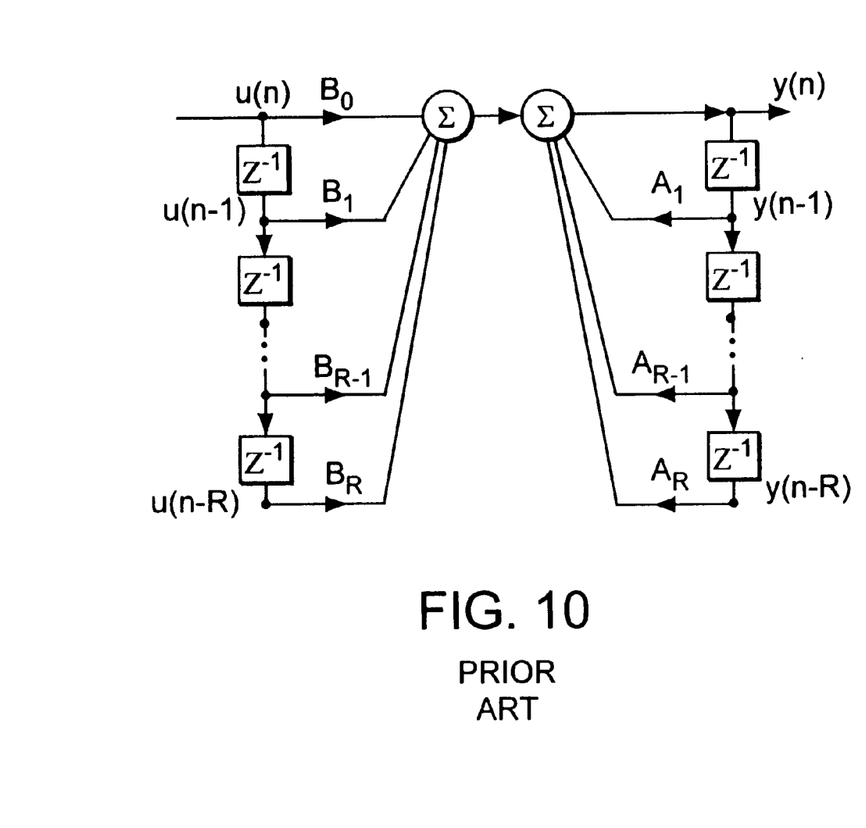
FIG. 10 is a block diagram of an Infinite Impulse Response Filter according to the prior art.

Another type of filter is an IIR filter where the current output depends also on previous outputs. This is illustrated in FIG. 10. It is not necessary for the number of delay elements storing y(n) to equal the number of delay elements storing u(n). The output y(n) for the IIR is given by $$y(n) = \sum_{k=1}^{R} A_k y(n-k) + \sum_{k=0}^{R} B_k u(n-k)$$

The following discussion is based around FIR filters, however it is easily extended to cover IIR filters. The overall frequency and transient response of the filter is set by the values of the coefficients and the number of delay elements present. To design a filter, the passband frequency, stopband frequency, passband ripple and stopband attenuation need to be specified. Using these specifications the number of coefficients in the filter and the values of the coefficients can then be obtained. It is typically necessary to increase the number of storage elements (R) in order to meet demanding constraints on the filter response. One such constraint that needs to be met in many applications is a desire for low bandwidth. This may be due to the need to reduce the effects of noise, since the noise outside the bandwidth of interest will be attenuated. In order to meet a low bandwidth requirement while having other characteristics such as a sharp roll-off, and little ripple in the passband or stopband, the number of coefficients needs to be increased.

Once the number of coefficients exceeds 1, there is an inherent delay in the response time of the filter to changes at its input. The old value of the input, (or a value directly related to it), is retained in the storage elements along the filter chain. When the input changes to a new value, the contents of the storage elements will initially be unaffected by the new input, so only the first component of the output summation will contain information about the new input value. The sum is therefore performed with R terms that are based on the old value of the input, and 1 term that takes into account the new input value. The next output will be based on R-1 old inputs and 2 new inputs. The output therefore only slowly tracks changes in the input, because for several outputs the output sum is more heavily weighted towards the old input value. For a symmetrical FIR filter, such as that illustrated in FIG. 9, with $B_0=B_R$, $B_1=B_{R-1}$, ..., then after (R+1)/2 inputs at the new level the output will only be midway between the old and new values. The output will not be fully settled until R+1 inputs have occurred at the new level.

If a large number of coefficients are present, then a change in the input will take a long time to propagate to the output. This is undesirable in many circumstances because changes at the input may need to be detected as rapidly as possible. A filter with a wider bandwidth would improve the time required to respond to changes at the input, however this filter would typically have a worse noise performance due to the wider bandwidth, and would therefore be unsuitable for that particular application.

SUMMARY OF THE INVENTION

In accordance with the present invention, a digital filtering system is fed by an input signal and produces an output signal from either a relatively low bandwidth digital filter or a relatively wide bandwidth digital filter selectively in accordance with the time rate of change in the level of the input signal.

With such an arrangement, the output signal is produced by the relatively low bandwidth digital filter when the input signal is slowly varying and the output signal is produced by the relatively wide bandwidth digital filter when the input signal changes rapidly, after which the output is produced from the relatively low bandwidth digital filter when the input signal reverts to its more slowly varying characteristics. Thus, the filtering system provides a fast response to step changes at the input, while still having a low bandwidth, low noise response when the input is steady. The low bandwidth filter can be optimized for noise performance and frequency response, while the wide bandwidth filter is optimized for response time.

In a preferred embodiment of the invention, the relatively wide bandwidth digital filter processes the input signal with a varying bandwidth filter; the bandwidth being initially relatively wide and then steadily reducing until the digital filtering system reverts to processing the input signal with the relatively low bandwidth digital filter.

In accordance with another feature of the invention, a digital filtering method is provided for producing an output signal from either a relatively low bandwidth digital filter or from a relatively wide bandwidth digital filter selectively in accordance with the time rate of change in the level of an input signal.

In a preferred embodiment, the relatively wide bandwidth digital filter processes the input signal initially with relatively wide bandwidth and the bandwidth is reduced until the output signal is produced from the relatively low bandwidth digital filter.

BRIEF DESCRIPTION OF THE DRAWING

Other features of the invention, as well as the invention itself will become more readily apparent from the following detailed description taken together with the accompanying drawings, in which.

DESCRIPTION OF THE PREFERRED EMBODIMENTS

Figure 1:
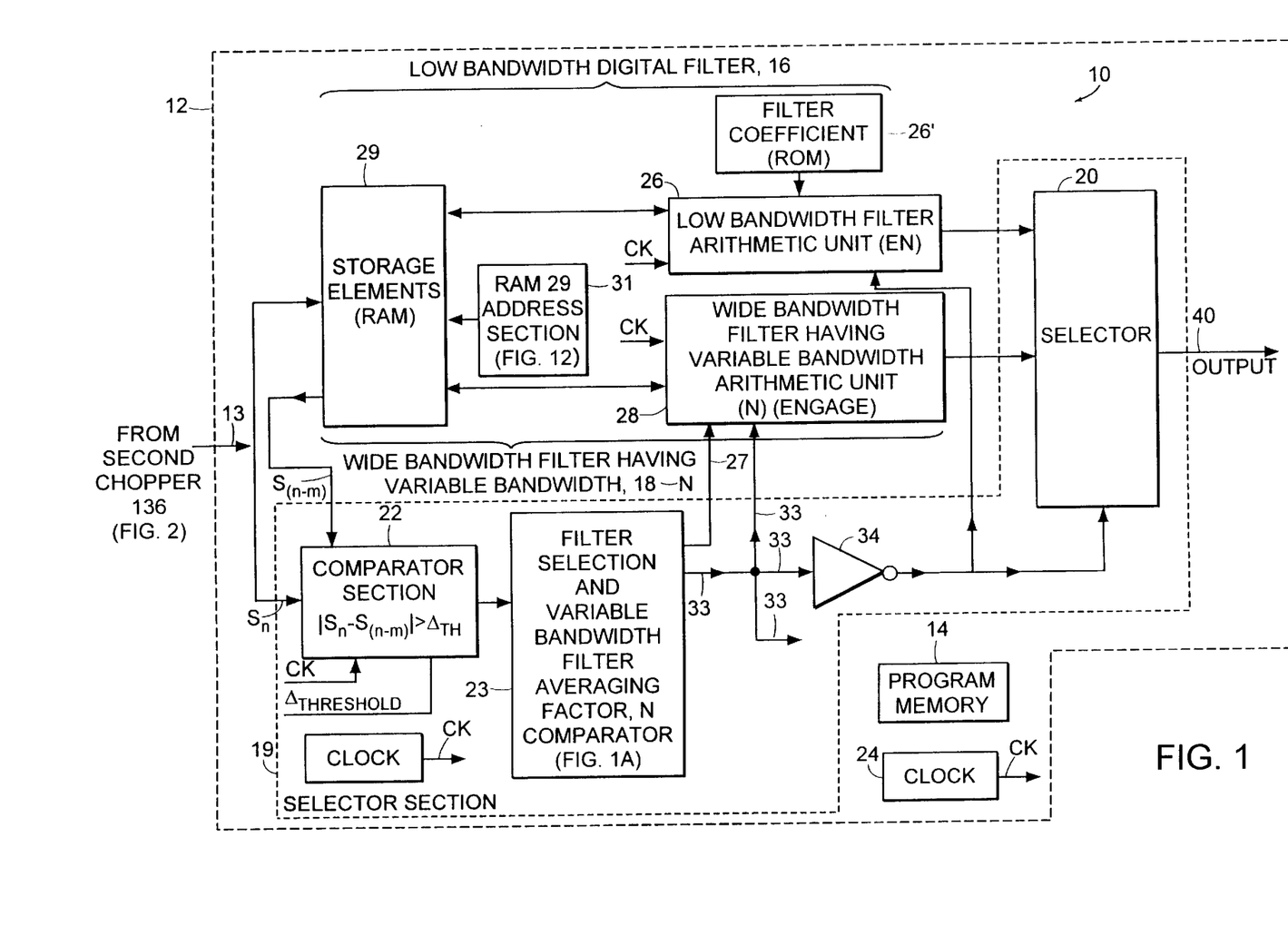
FIG. 1 is a block diagram of a digital filtering system according to the invention.

Referring now to FIG. 1, a digital filtering system 10 is shown. Such system 10 includes a digital processor 12 fed by an input signal on line 13. The signal on line 13 is here a sequence of digital words (i.e., samples) produced by an analog to digital conversion system 15, described in copending patent application entitled "Analog to Digital Conversion System", Serial No. 08/599,811, inventor Damien McCartney, assigned to the same assignee as the present invention, filed concurrently herewith, the contents thereof being incorporated herein by reference. Here, the digital filtering system provides the function of the output filter 50 described in the above referenced copending patent application.

Figure 2:
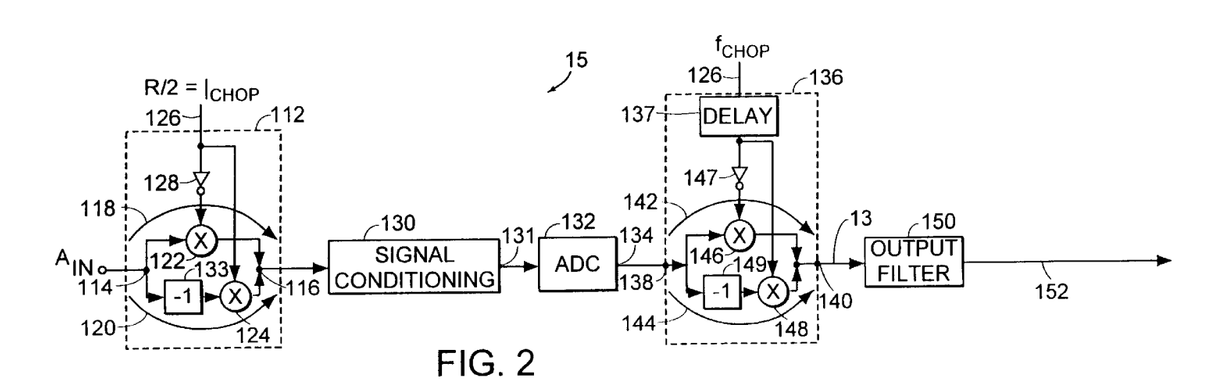
FIG. 2 is a block diagram of an analog to digital conversion system having the digital filtering system of FIG. 1.
Figure 3A:
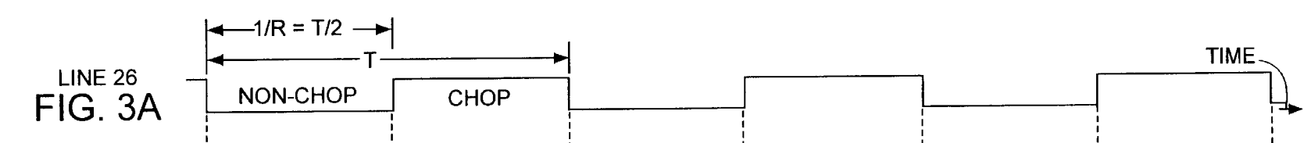
FIGS. 3A–3E are timing diagrams useful in understanding the operation of the analog to digital conversion system of FIG. 2.

More particularly, the analog to digital conversion system 15 is shown in FIG. 2 to include first chopper 112. The first chopper 112 has an input terminal 114 and an output terminal 116. The input terminal 114 is coupled to the output terminal 116 through two channels 118, 120, as shown. Each one of the channels 118, 120 includes a switch 122, 124, respectively, as shown. A train of binary signals (i.e., chop signals) is fed to the switches 122, 124 via line 126, as shown. The train of binary signals on line 126 is shown in FIG. 3A. Thus, the train of binary signals has a period, T, as shown in FIG. 3A. It is noted that while line 126 is coupled directly to switch 124, line 126 is coupled to switch 122 through an inverter 128, as shown. Also, it should be noted that an inverting, unity gain amplifier 133 is serially connected between the input terminal 114 and the output terminal 116 in channel 124, as shown.

Figure 3B:
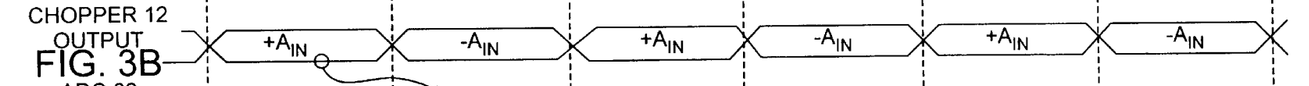

Thus, in operation, assume an analog signal, $A_{IN}$, is fed to input terminal 114. In response to one state of the binary signal on line 126, here, when the binary signal on line 126 is logic 0, during the first half of each period, T, (i.e., during 0–T/2) switch 122 is closed to pass the analog signal on input terminal 114 to output terminal 116 without any change in polarity in the input analog signal $A_{IN}$. During this first half of each period, T, (i.e., during 0–T/2) switch 124 is in an open circuit condition. One the other hand, during the next half period T/2 (i.e., from T/2 to T), when the binary signal on line 126 changes to a logic 1, switch 122 is opened and switch 124 is closed to thereby produce at output terminal 116 during this half period from T/2 to T, the input analog signal $A_{IN}$ with reversed polarity, i.e., the analog signal $-A_{IN}$, because of inverting amplifier 133. Thus, the first chopper 112 successively reverses the polarity of the analog signal, $A_{IN}$ at a rate, $R=2/T=2f_{CHOP}$. That is, the first chopper 112 is responsive to the chop signal on line 126 having the period T and passes the analog signal $A_{IN}$ to output 116 with non-reversed polarity (i.e., the signal $+A_{IN}$) during a first portion of the period T and with reversed polarity ($-A_{IN}$) during a second portion of the period T, as shown in FIG. 3B.

A signal conditioning circuit 130 is fed by the output 116 of the first chopper 112. The signal conditioning circuit 130, for example an amplifier, is fed by the signals produced by the first chopper 112 at output 116 to produce corresponding analog signals at the output 131 of circuit 130. Thus, the signal conditioning circuit 130 is fed sequentially by the signals $+A_{IN}$ and $-A_{IN}$, for producing with periodicity, T, a sequence of pairs of successive signals, $+A'_{IN}+V_{OSSC}$ and $-A'_{IN}+V_{OSSC}$, where $V_{OSSC}$ is any offset voltage produced by the signal conditioning circuit 130. Thus, the signal conditioning circuit 130 is fed by the output of the first chopper 112 for producing a first conditioned signal, $+A'_{IN}+V_{OSSC}$, during the first portion of the period T and a second conditioned signal, $-A'_{IN}+V_{OSSC}$, during the second portion of the period T.

Figure 3C:
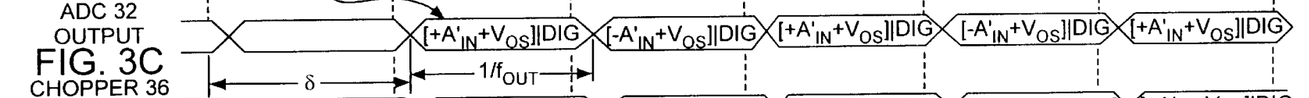

An analog to digital converter (ADC) 132, here a relatively high resolution ADC or sigma-delta modulator, as described in the above reference copending patent application, is provided for converting the analog signals produced by the signal conditioning circuit 130 at output 131 into sets of at least one digital word. In the case of a relatively high resolution ADC, each set is one parallel N-bit digital word and in the case of a sigma-delta modulator each set is a sequence of low resolution, one- or two-bit, digital words. Assuming the former, the sets of digital words are produced by the ADC at a rate, $f_{OUT}$, here at the rate $R=2/T$, as shown in FIG. 3C. As noted in FIG. 3C, an offset voltage, $V_{OS}$, corresponding to the total offset of the signal conditioning circuit and the analog to digital converter is also produced.

Thus, the ADC 132 produces a first digital word, $[+A'_{IN}+V_{OS}]_{DIG}$, corresponding to the first conditioned signal, $+A'_{IN}+V_{OSSC}$, and produces a second digital word, $[-A'_{IN}+V_{OSSC}]_{DIG}$, corresponding to the second conditioned signal, $-A'_{IN}+V_{OSSC}$, each one of such produced digital words including therein the offset voltage, $V_{OS}$, as shown in FIG. 3C. That is, the digital words $[+A'_{IN}+V_{OS}]_{DIG}$, $[-A'_{IN}+V_{OS}]_{DIG}$, ... are produced by the ADC 132 at a rate $F_{OUT}$. Here, $f_{OUT}=R$.

A second chopper 136 is fed by the digital words $[+A'_{IN}+V_{OS}]_{DIG}$ and $[-A'_{IN}+V_{OS}]_{DIG}$, produced by the analog to digital converter at the rate $f_{OUT}$, and produces, with the periodicity T, corresponding digital words $[+A'_{IN}+V_{OS}]_{DIG}$ and $[+A'_{IN}-V_{OS}]_{DIG}$. Thus, the second chopper 136 successively reverses at the rate R the polarity of the digital words produced by the analog to digital converter 132 on line 134. It is first noted that the second chopper 136 is fed with the series of digital words, on line 134. Thus, the second chopper 136 while functionally equivalent to the first chopper 112, uses digital processing to provide its function. However, for purpose of understanding, the second chopper is functionally represented in FIG. 2 as having an input terminal 138 and an output terminal 140. The input terminal 138 is coupled to the output terminal 140 through two channels 142, 144, as shown. Each one of the channels 142, 144 includes a switch 146, 148, respectively, as shown. The train of binary signals is fed to the switches 146, 148 via line 126, as shown. The train of binary signals on line 126 is, as noted above, shown in FIG. 3A. Thus, the train of binary signals has a period, T, as shown in FIG. 3A. It is noted that line 126 is coupled to a delay 137. While the output of delay 137 is coupled directly to switch 148, the output of delay 137 is coupled to switch 148 through an inverter 147, as shown. Also, it should be noted that an inversion 149 is provided serially between the input terminal 138 and the output terminal 140 in channel 144, as shown. The delay 137 is provided to account for conversion delay in the ADC 132. Here, the delay 137 in the example shown in FIG. 3C is δ, as shown.

Figure 3D:
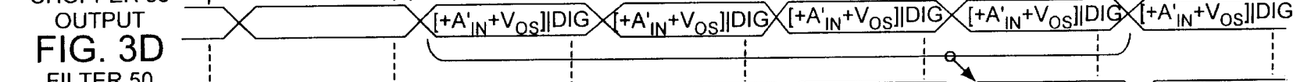

Thus, the second chopper 136 is a second switch section, fed by the digital words $[+A'_{IN}+V_{OS}]_{DIG}$ and $[-A'_{IN}+V_{OS}]_{DIG}$, and produces during each period, T, a pair of corresponding digital words $[+A'_{IN}+V_{OS}]_{DIG}$ and $[+A'_{IN}-V_{OS}]_{DIG}$. That is, the second chopper 136 successively reverses the polarity of the digital words produced by the analog to digital converter 132 at the rate R. Thus, in operation, digital words produced at the output of ADC 132 corresponding to the first half of each period T, i.e., from 0 to T/2, appear with a reversal in polarity at output 140 of the second chopper 136, as shown in FIG. 3D. On the other hand, corresponding to the next half period T/2 (i.e., from T/2 to T), the digital words produced at the output of ADC 132 appear with a reversal in polarity at output 140 of the second chopper 136, as shown in FIG. 3D. To put it another way, the second chopper 136 is responsive to the chop signal on line 126 and passes to output 140 of the second chopper 136 one of the produced first and second digital words, $[+A'_{IN}+V_{OS}]_{DIG}$, $[-A'_{IN}+V_{OS}]_{DIG}$, with non-reversed polarity, and passes to the output 140 the other one of produced first and second digital words $[+A'_{IN}+V_{OS}]_{DIG}$, $[-A'_{IN}+V_{OS}]_{DIG}$ with reversed polarity. For example, referring to FIGS. 3C and 3D, here the digital words $[+A'_{IN}+V_{OS}]_{DIG}$ are passed to output 140 with non-reversed polarity and the digital words $[-A'_{IN}+V_{OS}]_{DIG}$ are passed to output 140 with reversed polarity.

Figure 3E:
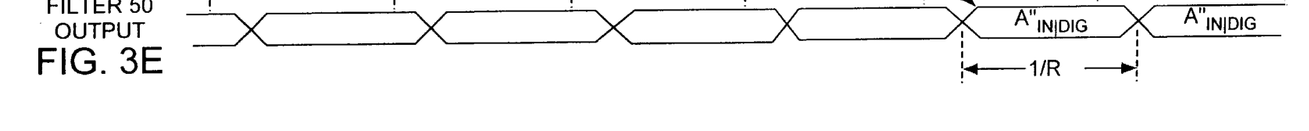

An output filter 150, here provided by the digital filtering system 10 (FIG. 1), is fed by the output 140 of the second chopper 136 and produces, on receipt of the first produced digital word $[+A'_{IN}+V_{OS}]_{DIG}$, a first output digital word $A''_{IN}|_{DIG}$ and, on receipt of the second produced digital word $[-A'_{IN}+V_{OS}]_{DIG}$, a second output digital word $A''_{IN}|_{DIG}$, with the offset voltage being removed from each of such output digital words, as shown in FIG. 3D. To put it another way, the output filter 150 is fed by the sequence of digital words $[+A'_{IN}+V_{OS}]_{DIG}$ and $[+A'_{IN}-V_{OS}]_{DIG}$, produced by the second chopper 136 at output 140. The output filter 150 removes the $V_{OS}|_{DIG}$ portion of the sequence of digital words over a predetermined period of time. For purposes of understanding, when referring to FIG. 3E, the digital words $[+A'_{IN}+V_{OS}]_{DIG}$, $[+A''_{IN}-V_{OS}]_{DIG}$, produced by the second chopper 136 at output 140 are filtered over 2T by filter 150 to thereby remove the offset voltage $V_{OS}|_{DIG}$ components.

While the chopper system has been discussed above for a relatively high resolution ADC, a complete discussion of a sigma-delta modulator system using chopping is described in the above referenced copending patent application entitled "Analog to Digital Conversion System", inventor Damien McCartney, assigned to the same assignee as the present invention, filed concurrently herewith, the contents of which are incorporated herein by reference.

Figure 1A:
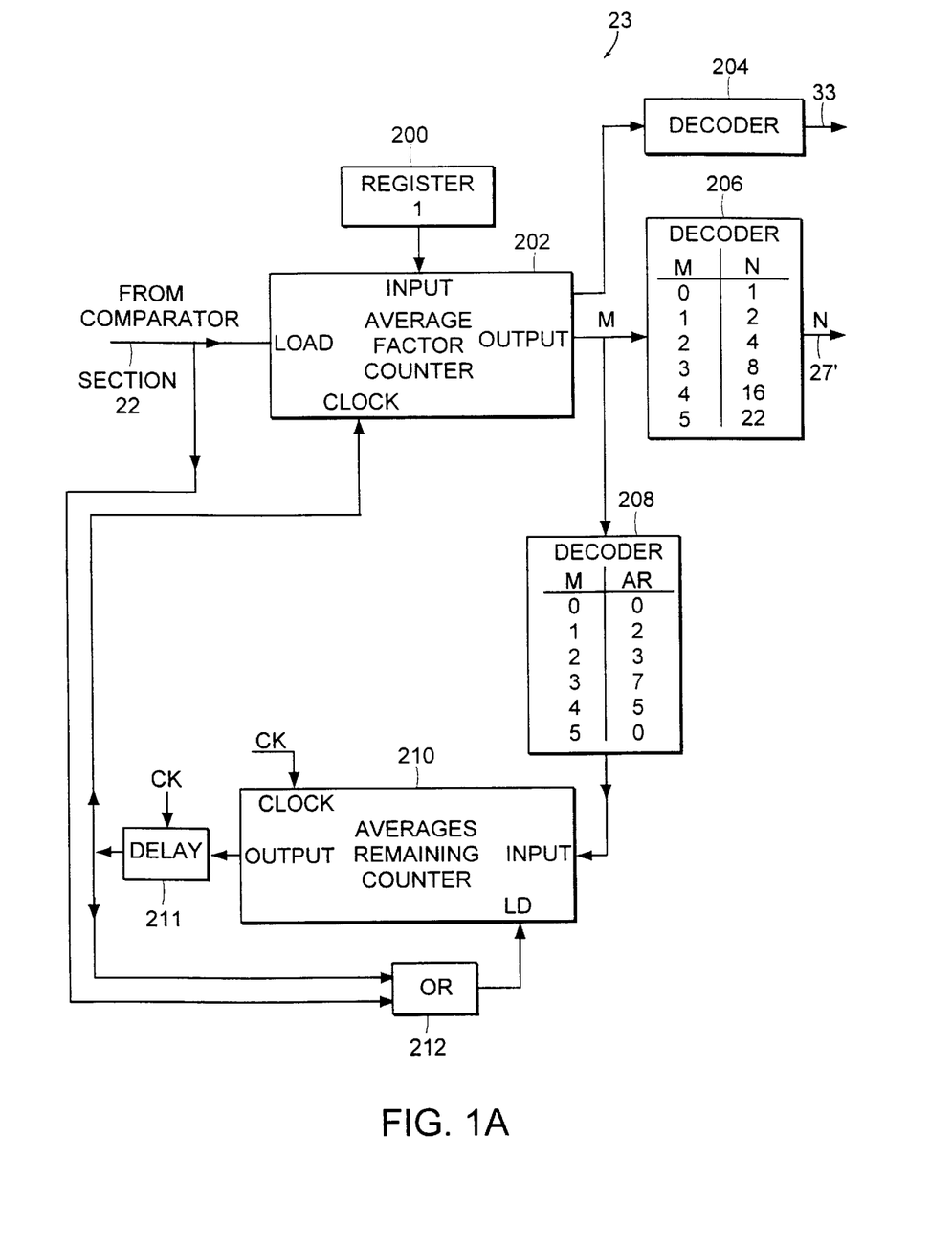
FIG. 1A is a block diagram of a filter selection and variable bandwidth filter averaging factor selector used in the digital filtering system of FIG. 1.

Referring now again to FIG. 1, as noted above, the digital filtering system 10 performs the function of the output filter 150 in FIG. 2. The processor 12 includes a program memory 14 adapted to store a computer program represented by the flow diagram shown in FIG. 4, a low bandwidth digital filter 16, a wide bandwidth digital filter 18 here having a variable bandwidth, a selector section 19, and clock 24. The selector section 19 includes a selector 20, a comparator section 22, a filter selection and variable bandwidth filter averaging factor, N, selector 23 (shown in FIG. 1A) and an inverter 34. The low bandwidth and wide bandwidth digital filters 16, 18 are here Finite Impulse Response (FIR) digital filters. The filters 16, 18 have calculation modules or arithmetic units 26, 28 which share storage elements, here memory locations in random access memory (RAM) 29. The memory locations are addressed by a RAM address section discussed in detail in connection with FIG. 12. Suffice it to say here, that the low bandwidth digital filter arithmetic unit 26 and the wide bandwidth digital filter arithmetic unit 28 are enabled (EN) are different times. The enable (EN) of arithmetic unit 28 is coupled directly to selector 23 whereas the enable (EN) of arithmetic unit 26 is shown coupled to selector 23 through the inverter 34. Thus, here, either the low bandwidth digital filter 16 or the wide bandwidth digital filter 18 will be enabled by the binary signal produced on line 33 by the selector 23.

Here, low bandwidth digital filter 16 has a fixed bandwidth and performs a full FIR convolution, involving multiplications and summations over a predetermined number, here over 22 input signal samples on line 13 stored in 22 storage locations in RAM 29. That is, low bandwidth digital filter 16 is here a 22 coefficient symmetrical low bandwidth FIR digital filter. The coefficients, "B" (FIG. 9), used by the arithmetic unit are stored in a read only memory (ROM) 26'.

Here, the wide bandwidth digital filter 18 has a variable bandwidth. That is, as will be described, when enabled in response to comparator section 22 detecting a step change in the input signal on line 13, the wide bandwidth filter 18 averages the samples by an increasing number of samples and thereby correspondingly reduces its bandwidth in accordance with data fed thereto by the selector 23 on bus 27. Here, the wide bandwidth digital filter 18 uses up to 16 input signal samples (i.e., digital words) in producing a corresponding output digital word. Thus, the wide bandwidth digital filter 18 uses the same 22 storage locations in RAM 29 as the low pass digital filter 16; however the wide bandwidth digital filter 18 will only use, at most, the 16 most recent samples. The wide band digital filter 18 is here also a FIR digital filter.

In operation, the digital filtering system 10 is fed by an input signal on line 13 (i.e., the output on line 140 of the second chopper 136 (FIG. 2)) and produces an output signal on line 40 from either the relatively low bandwidth digital filter 16 or the relatively wide bandwidth digital filter 18 selectively in accordance with the time rate of change in the input signal on line 13. More particularly, the output signal on line 40 is produced by the relatively low bandwidth digital filter 16 when the input signal on line 13 is slowly varying and the output signal on line 40 is produced by the relatively wide bandwidth filter 18 when the input signal on line 13 changes rapidly, after which the output on line 40 is produced from the relatively low bandwidth filter 16 when the input signal reverts to its more slowly varying characteristics.

As described in connection with FIGS. 2 and 3A–3E, the input to filtering system 10 will be a digital word representing a sampled analog signal plus an offset voltage (i.e. $[A'_{IN}+V_{OS}|_{DIG}]$) and a succeeding sample of the analog signal will be a digital word representing a sampled analog signal minus an offset voltage (i.e. $[A'_{IN}-V_{OS}|_{DIG}]$) where $A'_{IN}$ is a digitalized input signal sample and $V_{OS}$ is the total offset voltage from the ADC and/or any signal conditioning circuitry between a first chopper and a second chopper. The filtering system 10 will remove this polarity varying offset voltage (i.e., $+V_{OS}$, $-V_{OS}$) and thereby produce a series of outputs $A''_{IN}|_{DIG}$ with $V_{OS}$ removed.

A comparison is made by subtracting a sample $S_{n-m}$ from sample $S_n$ at each clock pulse CK. These samples are stored in RAM 29. Thus, the comparison is made between a current input signal sample $S_n$ and a previous input signal sample, $S_{n-m}$ where here m=2 (i.e., the comparison is made between two $[A'_{IN}+V_{OS}|_{DIG}]$ terms or two $[A'_{IN}-V_{OS}|_{DIG}]$ terms so that the offset is not seen as a step change. More particularly, the comparison is made by subtracting the sample $S_{n-m}$ from the sample $S_n$ at each clock pulse, CK. If the absolute difference $|S_{n-m}-S_n|=\Delta$ is greater than a predetermined reference threshold, $\Delta_{THRESHOLD}$, then it is deemed that a step change has occurred in the input signal. In such case, the wide bandwidth filter 18 is selected by the selector section 23 setting active a "step change" flag; here raising the level of line 33. As noted above, the wide bandwidth filter 18 is a variable bandwidth filter. It starts off as an average by 2 and increases by a factor of 2 in a manner to be described. (It should be noted that if chopping is not performed, it starts off as an average by 1). Thus, in general, an averaging factor starts off as an averaging factor, $N_0$, and then successively increases) as described.

More particularly, whenever an input signal on line 13 is applied to the digital filtering system 10, the comparator section 22, which is fed by line 13, makes the comparison described above. If a step change in the input signal is deemed to have occurred in the input signal, the wide bandwidth filter 18 is enabled to an appropriate averaging factor, (i.e., bandwidth) and the "step change" flag (line 33) is set active. If no step change is deemed to have occurred in the input signal, then a check is made to determine whether the wide bandwidth filter 18 or low bandwidth filter 16 is currently selected based on previous calculations. If the low bandwidth filter 16 is selected (i.e., there is not a step change in the input signal currently being filtered by the wide bandwidth filter 18), the low bandwidth filter 16 is enabled and its output is used as the output of the digital filtering system 10. If, on the other hand, the wide bandwidth filter 18 is actively processing the input signal, then an averaging is performed by the wide band filter using the then current averaging factor (i.e., the then current bandwidth of the wide bandwidth filter).

The averaging factor of the wide bandwidth filter 18 starts off at 2, as noted above, and is then increased in powers of 2 to 4, 8, 16 . . . to allow the wide bandwidth filter 18 to steadily reduce its bandwidth and thereby become more accurate as more input samples become available. More particularly, after averaging with the initial wide bandwidth filter 18 bandwidth, a check is made to determine if more averages remain to be performed using the current averaging factor (i.e. bandwidth), or whether there are now sufficient input samples at the new level to produce the output of the digital filtering system 10 using the next averaging factor (i.e., the next lower bandwidth of the wide bandwidth filter 18). If there are more averagings to be performed, (i.e., more digital filtering with the current bandwidth) the "averages remaining" to be performed is decremented (i.e., the count in the "averages remaining" counter 210 will be decremented) until it reaches zero. When the "averages remaining" count in counter 210 reaches zero, the next output will be produced with the current averaging factor and the "averages remaining" counter 210 is interrogated and the averaging factor is advanced, (i.e., incremented), to the next averaging factor thereby again reducing the bandwidth of the wide band filter 18. If this new averaging factor is a predetermined factor corresponding to the narrowest bandwidth of the wide bandwidth filter 18, this implies that there are now sufficient samples for the low bandwidth filter 16 processing. In such case, the "step change" flag, (i.e., the binary signal on line 33) is deactivated (i.e., cleared) the output of the digital filtering system 10 on line 40 will be performed using the low bandwidth filter 38 until another step change is deemed to have occurred in the input signal.

It should be noted, that because the input signal on line 13 is being continually examined by the comparator section 22, it is possible to detect that a step change in the input signal occurs while the previous step change has not yet settled sufficiently for low bandwidth filter 16 processing (i.e., a step change in the input signal occurs while the "step change" flag (i.e., the binary signal on line 33) is active. In such case, the wide bandwidth filter 18 recommences performing the average by 2 operation even if it had been performing an average by some other factor. To put it another way, the wide bandwidth filter 18 reverts to its widest bandwidth even if it was processing the input signal with a lower bandwidth.

The change from one averaging factor to another factor (i.e., the change from one bandwidth to a lower bandwidth) occurs automatically when there are sufficient input samples to perform an average by N with N input samples at the new level. For example, the wide bandwidth filter 18 advances from an average by 4 to an average by 8 once there are 8 input samples that have exceeded the step threshold comparison (it being noted that the average by 8 occurs after 9 samples at the input level due to the comparison being made to the input two previous). This means that there will be four outputs produced at the digital filtering system 10 on line 40 using an average by 4. Once the next input sample arrives, there will now be enough data to perform an average by 8 and 8 samples are produced with an average by 8. Thus, here the wide bandwidth filter 18 uses 16 input samples and produces 22 outputs after the input reaches a substantially constant level before reverting to the low bandwidth filter (i.e., changes from sample to sample less than $\Delta_{THRESHOLD}$).

Figure 4:
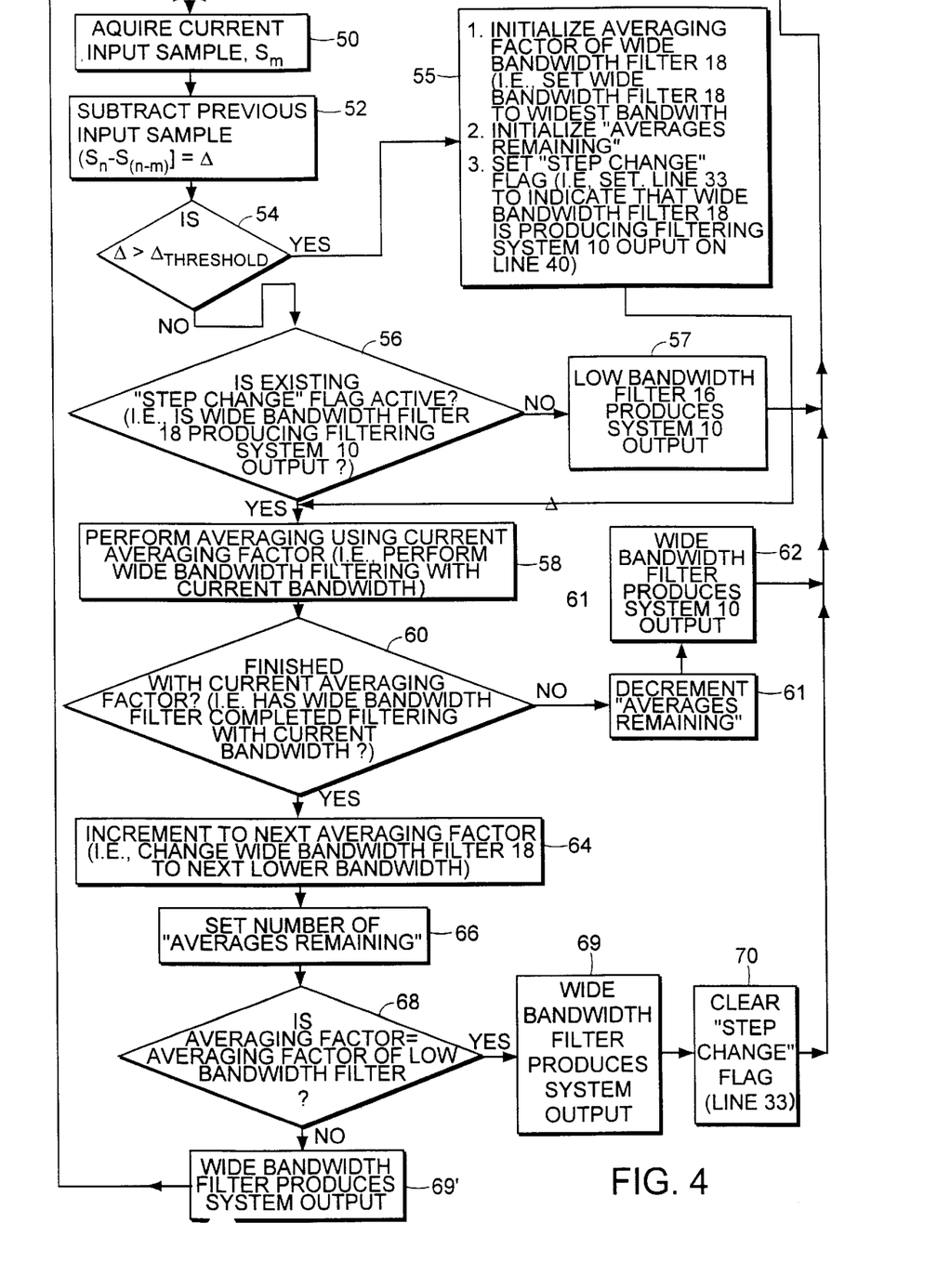
FIG. 4 is a flow diagram of the steps used by the digital filtering system of FIG. 1.

Thus, referring to FIG. 4, in Step 50, a current sample, $S_n$, of the input signal on line 13 is acquired by the digital filtering system 10. In response to a subsequent clock pulse on line CK, comparator section 22 compares the level of the current sample $S_n$ with the previous sample, $S_{n-m}$, where in this example m=2, Step 52. Thus, here a comparison is made between $\Delta=|S_{n-2}-S_n|$ and a predetermined threshold difference $\Delta_{THRESHOLD}$ by comparator section 22, Step 54. If the difference in level between $S_n$ and $S_{n-2}$ (i.e., $\Delta=|S_{n-2}-S_n|$) is greater than the predetermined threshold difference $\Delta_{THRESHOLD}$, a step change is deemed to have occurred in the input signal: (1) the averaging factor for the wide bandwidth filter 18 is initialized, here to 2 (i.e., the wide bandwidth filter is set to its widest bandwidth); (2) the "averages remaining" is initialized, here to 2; and (3) the "step change" active software flag is produced by the selector section 19 (i.e., the selector 23 enables the wide bandwidth digital filter arithmetic unit 28 and disables the low bandwidth digital filter arithmetic unit 26 (here represented by the binary signal on line 33), Step 55.

Thus, referring to an example shown in FIGS. 5A–5D, where m=2, samples $S_1$, $S_2$ and $S_3$ of the input signal (FIG. 5C) are equal, here equal to zero. Thus, from Step 54, $\Delta<\Delta_{THRESHOLD}$. In such case, the digital filtering system 10 determines whether the "step change" flag is active (i.e., whether the signal on line 33 is at a low level or a high level). Here, such flag not being active results in the low bandwidth filter 16 producing the output on line 40 as indicated in Step 57.

Figure 5A:
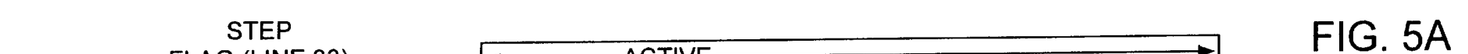
FIGS. 5A–5E are timing diagrams useful in understanding the digital filtering system of FIG. 1 and the method of FIG. 4.
Figure 5B:
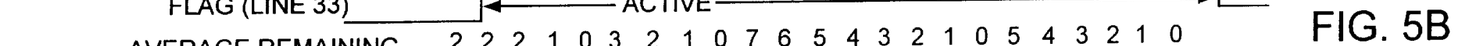

When sample $S_4$, here 0.5, is acquired, Step 50, from Step 52, $S_4-S_2=\Delta=0.5$. Thus, because the difference $\Delta$ has a level greater than the predetermined threshold level, here $\Delta_{THRESHOLD}=0.1$, from Step 54, system proceeds with Step 55. In Step 55, and referring also to FIG. 1A, the state of the control signal produced by comparator 22 changes thereby loading a predetermined value, here 1, stored in register 200 into "averaging factor" up-counter 202. The contents of the "averaging factor" up-counter 202, M, is decoded by decoders 204, 206 and 208. Decoder 204 detects that the contents of counter 202 is no longer 5 and therefore raises the level on line 33, i.e., produces a flag. The decoder 206 decodes the 1 stored "averaging factor" up-counter 202 and produces the averaging factor, N, here N=2, on bus 27. The decoder 208 decodes the 1 stored in counter 202 and produces the "average remaining" number AR, here 2, which is loaded into "averages remaining" down-counter 210 as the signal produced by section 22 is passed through OR gate 212 to the load LD terminal of counter 210. Thus, the averaging factor, N, is initialized to 2 (FIG. 5C); the "averages remaining", AR, stored in counter 210 is initialized to 2 (FIG. 5B); and the "step change" flag (line 33) is set active (FIG. 5A) so that the wide bandwidth digital filter arithmetic unit 28 is enabled and the low bandwidth digital filter arithmetic unit 26 is disabled, Step 55. The digital filtering system 10 proceeds to Step 58. The digital filtering system 10 performs, in accordance with Step 58 the average by 2 here $S_4'=(S_4+S_3)/2=0.25$ as shown in FIG. 5D, Step 58. It is noted that a clock pulse is produced for counter 202 only when the contents of counter 210 returns to 0 and then only after a one clock pulse delay provided by delay 211. Thus, the contents of counter 202 remains at 1 and N remains at 2.

Figure 5C:
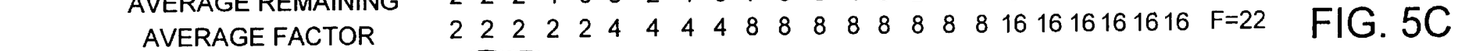
Figure 5D:
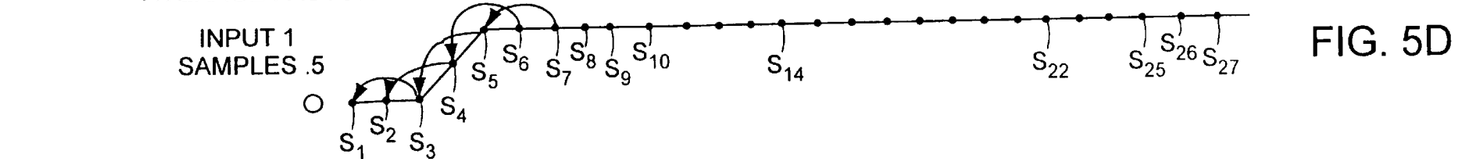
Figure 5E:
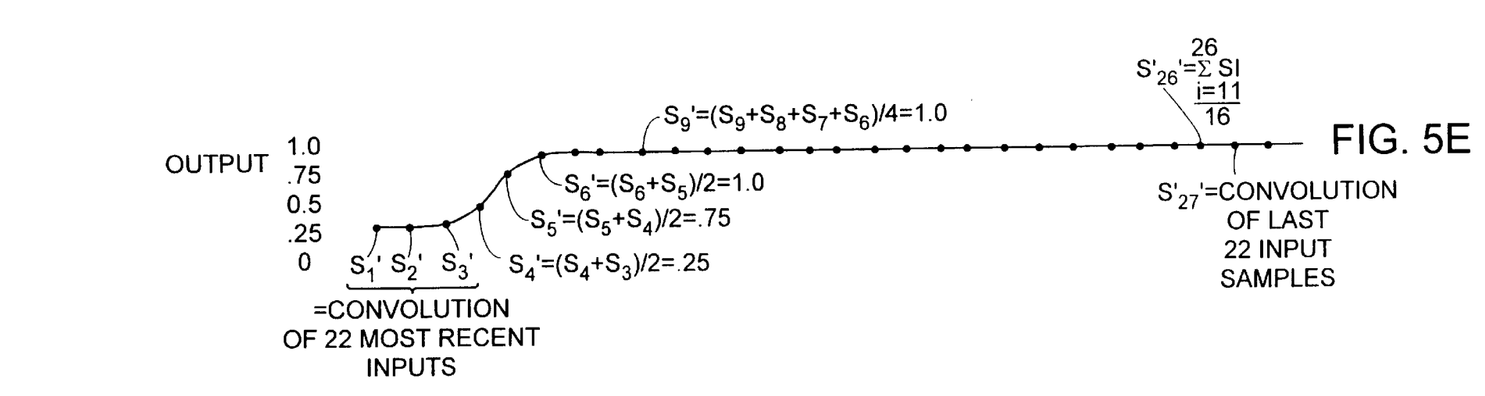

The next sample, $S_5$, here 1, is acquired as shown in FIG. 5C. Again, Step 52 determines $\Delta>\Delta_{THRESHOLD}$. The "averaging factor" up-counter 202 is again, in accordance with Step 55, initialized to 1 so that again N=2 to set wide bandwidth filter 18 to the widest bandwidth for this chop mode, i.e., here the average factor, N, is again set to 2, as shown in FIG. 5B and the "average remaining" counter 210 is again initialized to 2. The "step change" flag (line 33) remains set, i.e., active. The process proceeds again to Steps 58, 60, 61 and the output $S'_5=(S_5+S_4)/2$ is produced by the digital filtering system 10, Step 62. It is noted that Step 61 decrements the "average remaining" to 1 (FIG. 5B).

The next sample, $S_6$, is taken. Since the difference between $S_6$ and $S_4$ is again greater than $\Delta_{THRESHOLD}$, and the process described above repeats with N and AR both initially equal to 2.

The next sample $S_7$, here having the same level as $S_5$, is acquired as shown in FIG. 5C. Step 52 determines $\Delta<\Delta_{THRESHOLD}$. A check is made in Step 56 if the existing "step change" flag is active. Because the "step change" flag has not been deactivated, it is still active as shown in FIG. 5A. Thus, the averaging is performed with the current averaging factor, which is still 2; as noted above, however here the comparator section 22 does not detect a difference $\Delta>\Delta_{THRESHOLD}$ and therefore the "average remaining" counter 210 is not initialized to 2, so it remains at 1 from Step 61 for sample $S_6$. It is noted that Step 61 decrements the "averages" remaining counter to 0 (FIG. 5B). The process proceeds again to STEPs 58, 60, 61 and the output $S_7'=(S_7+S_6)/2$ is produced by the digital filtering system 10 (Step 62).

The next sample $S_8$, here having the same level as $S_6$, is acquired as shown in FIG. 5C. Thus, Step 54 indicates that $\Delta<\Delta_{THRESHOLD}$. A check is made in Step 56 if the existing "step change" flag is active. Because the "step change" flag has not been deactivated, it is still active as shown in FIG. 5A. Thus, the averaging is performed with the current averaging factor, N, which is still 2; as noted above, however, the "average remaining" counter 210 was decremented to 0 in Step 61 for sample $S_7$. The averaging produces an output sample $S'_8=(S_8+S_7)/2$, Step 58. Thus, from Step 60, a determination is made that the digital filtering system 10 has completed processing with the current, here 2, averaging factor. Thus, from Step 64, the system changes the wide bandwidth filter 18 to the next lower bandwidth by using an increased averaging factor of N=4, as shown in FIG. 5B for the next acquired sample, $S_9$. Also, the number of "averages remaining" counter 210, as noted above, is set, here to 3, as shown in FIG. 5C, Step 66. Here, the averaging factor of the low bandwidth filter is 22. Thus, from Step 68, because the averaging factor is now 4 and therefore not equal to 22, Step 70, the result $S_8'$ is output (Step 69').

The process repeats, it being noted from FIGS. 5A–5D: samples $S_9'$, $S_{10}'$, $S_{11}'$ and $S_{12}'$ are produced using averages of 4 samples; input sample $S_{13}$ results in the average factor increasing from 4 to 8, with the "average remaining" being initialized to 7; input sample $S_{21}$ results in the average factor increasing from 8 to 16, with the "average remaining" being initialized to 5; and sample $S_{26}$ results in the step 68 indicating that the "step change" flag, line 33 (FIG. 5A) should be changed as in Step 70 with the result that the low bandwidth filter 16 produces the output samples on line 40 (FIG. 1) for subsequent samples until another step change. Output $S_{26}'$ is the last output to be produced using the wide bandwidth filter 18 (Step 69), while output $S_{27}'$ is the first output to be produced with the low bandwidth filter after the change in input has occurred.

The process is summarized in the following TABLE:

TABLE

| Sample | Output Section 22 | Counter 202, M | Decoder 204, Line 33 | Decoder 206, N | Counter 210, AR |
|---|---|---|---|---|---|
| $S_1$ | $\Delta < \Delta_{TH}$ | 5 | LOW | 22 | 0 |
| $S_2$ | $\Delta < \Delta_{TH}$ | 5 | LOW | 22 | 0 |
| $S_3$ | $\Delta < \Delta_{TH}$ | 5 | LOW | 22 | 0 |
| $S_4$ | $\Delta < \Delta_{TH}$ | 1 | HIGH | 2 | 2 |
| $S_5$ | $\Delta < \Delta_{TH}$ | 1 | HIGH | 2 | 2 |
| $S_6$ | $\Delta < \Delta_{TH}$ | 1 | HIGH | 2 | 2 |

TABLE-continued

| Sample | Output Section 22 | Counter 202, M | Decoder 204, Line 33 | Decoder 206, N | Counter 210, AR |
|---|---|---|---|---|---|
| $S_7$ | $\Delta < \Delta_{TH}$ | 1 | HIGH | 2 | 1 |
| $S_8$ | $\Delta < \Delta_{TH}$ | 1 | HIGH | 2 | 0 |
| $S_9$ | $\Delta < \Delta_{TH}$ | 2 | HIGH | 4 | 3 |
| $S_{10}$ | $\Delta < \Delta_{TH}$ | 2 | HIGH | 4 | 2 |
| $S_{11}$ | $\Delta < \Delta_{TH}$ | 2 | HIGH | 4 | 1 |
| $S_{12}$ | $\Delta < \Delta_{TH}$ | 2 | HIGH | 4 | 0 |
| $S_{13}$ | $\Delta < \Delta_{TH}$ | 3 | HIGH | 8 | 7 |
| $S_{14}$ | $\Delta < \Delta_{TH}$ | 3 | HIGH | 8 | 6 |
| $S_{15}$ | $\Delta < \Delta_{TH}$ | 3 | HIGH | 8 | 5 |
| $S_{16}$ | $\Delta < \Delta_{TH}$ | 3 | HIGH | 8 | 4 |
| $S_{17}$ | $\Delta < \Delta_{TH}$ | 3 | HIGH | 8 | 3 |
| $S_{18}$ | $\Delta < \Delta_{TH}$ | 3 | HIGH | 8 | 2 |
| $S_{19}$ | $\Delta < \Delta_{TH}$ | 3 | HIGH | 8 | 1 |
| $S_{20}$ | $\Delta < \Delta_{TH}$ | 3 | HIGH | 8 | 0 |
| $S_{21}$ | $\Delta < \Delta_{TH}$ | 4 | HIGH | 16 | 5 |
| $S_{22}$ | $\Delta < \Delta_{TH}$ | 4 | HIGH | 16 | 4 |
| $S_{23}$ | $\Delta < \Delta_{TH}$ | 4 | HIGH | 16 | 3 |
| $S_{24}$ | $\Delta < \Delta_{TH}$ | 4 | HIGH | 16 | 2 |
| $S_{25}$ | $\Delta < \Delta_{TH}$ | 4 | HIGH | 16 | 1 |
| $S_{26}$ | $\Delta < \Delta_{TH}$ | 4 | HIGH | 16 | 0 |
| $S_{27}$ | $\Delta < \Delta_{TH}$ | 5 | LOW | 22 | 0 |

Figure 6:
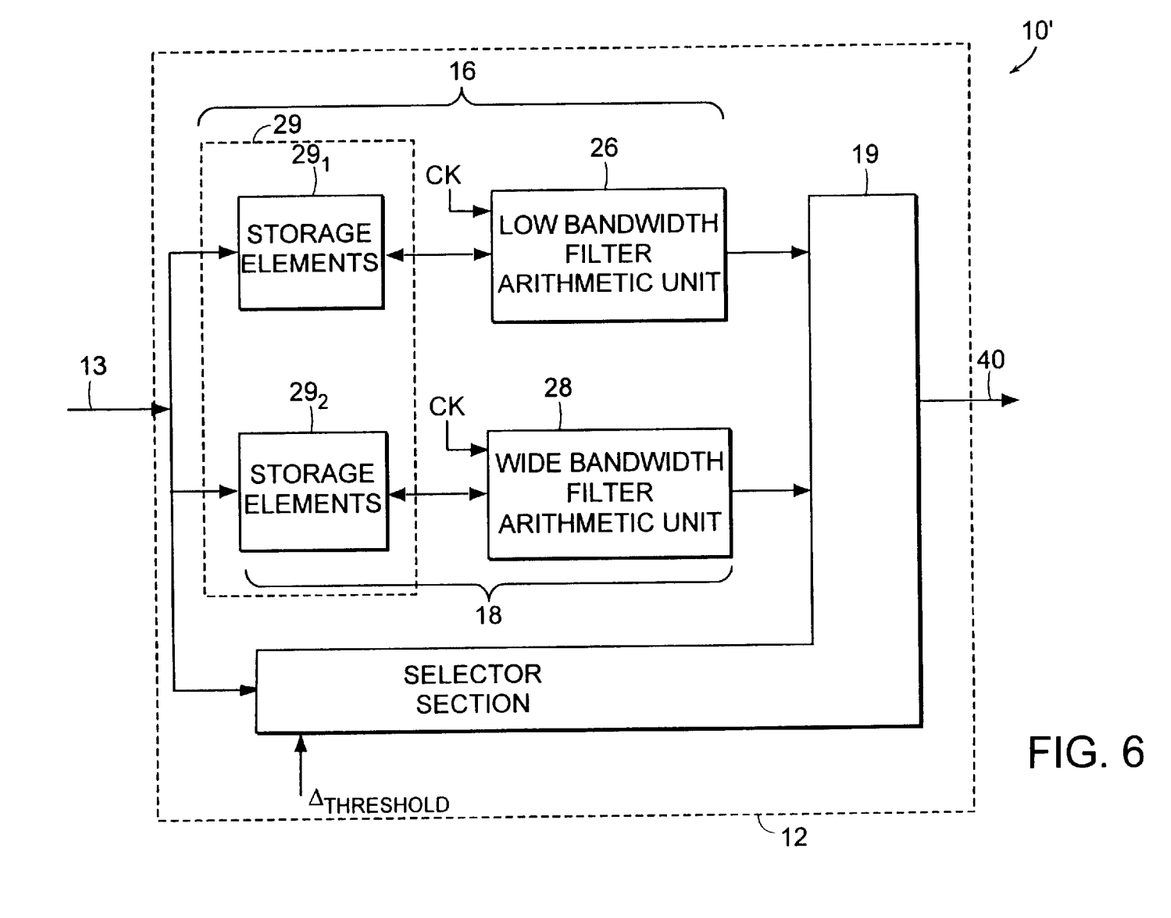
FIGS. 6 through 8 are block diagrams of alternative embodiments of the digital filtering system according to the invention.
Figure 7:
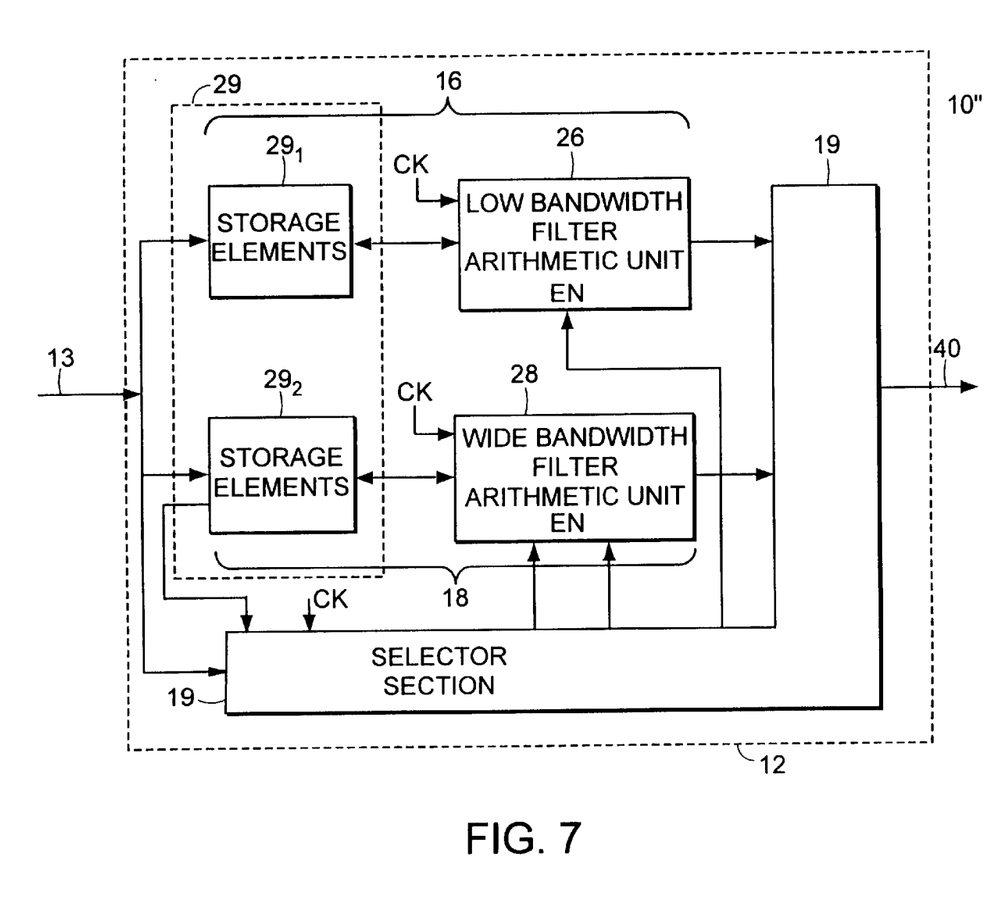
Figure 8:
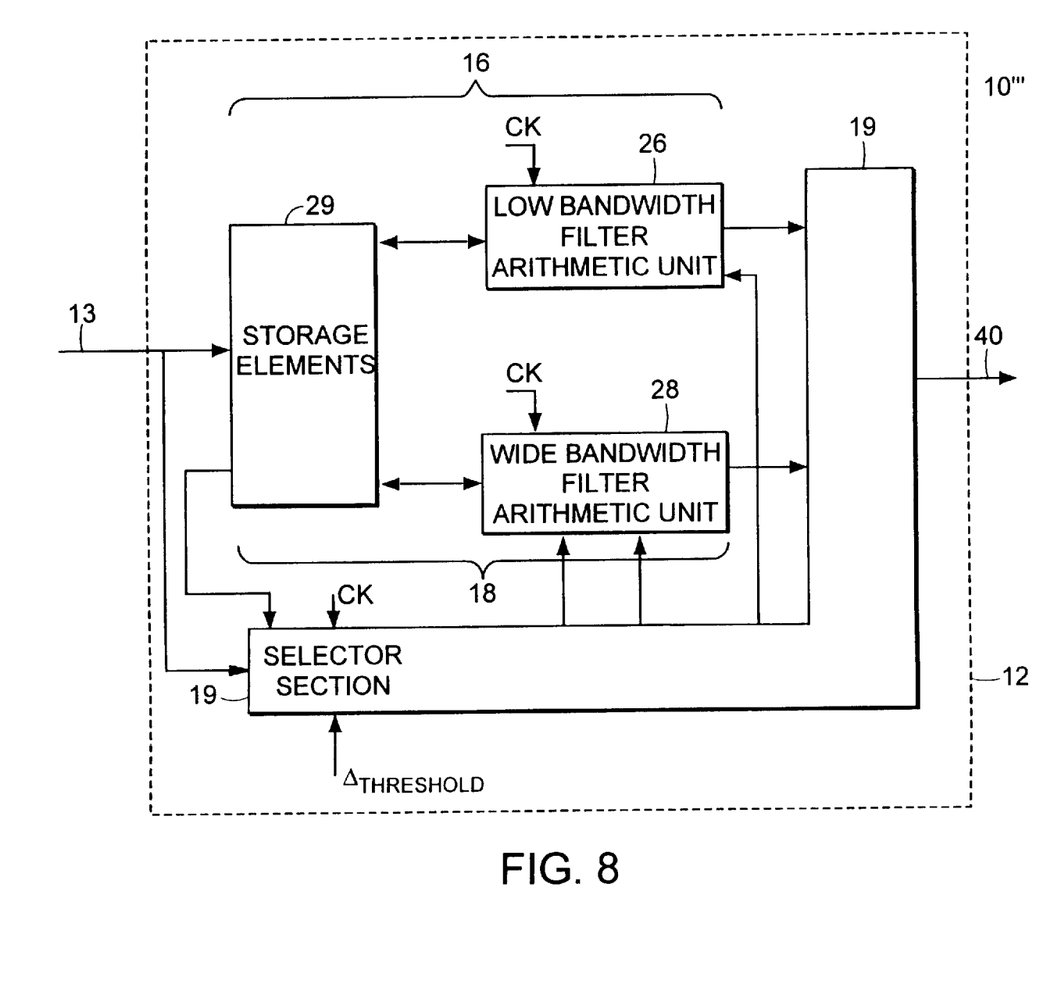

Referring now to FIGS. 6 through 8, alternative embodiments of the digital filtering system 10, are shown. Thus, in FIG. 6 the digital filters 16, 18 in digital filtering system 10' each includes its own storage elements $29_1$, $29_2$, respectively. Here, the input samples are stored in each storage element of the filters 16, 18. The computation of each filter 16, 18 is then performed. The computation of both filters 16, 18 may be performed in parallel using separate arithmetic units, or sequentially using a single arithmetic unit. The output of one of the filters 16, 18 is then selected, depending on the "step change" flag condition produced by comparator section 22.

In FIG. 7, another alternative embodiment of the digital filtering system 10" uses independent storage elements $29_1$, $29_2$ for each of the filters 16, 18, as in the system shown in FIG. 6. Here, as in FIG. 1, the computation is performed at any one time by only one of the filters 16, 18. As in FIG. 1, the one of the filters 16, 18 producing the digital filtering system 10" output is selected by the comparator section 22.

Another alternative embodiment of the digital filtering system 10''' is shown in FIG. 8. The digital filtering system 10''' uses common stage elements 29. The wide bandwidth filter 18 may not use all these storage elements in calculating its output. The computation of filters 16, 18 is performed using either a shared arithmetic unit or separate arithmetic units. One of the filters 16, 18 is selected to provide the system output in accordance with comparator section 22.

It should be noted that if filters 16, 18 are Infinite Impulse Response (IIR) filters, the output of each one of the filters 16, 18 would also have to be fed back to the storage elements. Therefore, the digital filtering systems 10, 10''' described in FIGS. 1 and 8 would be unsuitable for IIR implementations because they require shared storage elements and, in general, filter 16 and filter 18 would not produce identical results so that the filters 16, 18 could not share the storage elements 29 that record previous outputs since the outputs would be different for each of the filters 16, 18.

Figure 11:
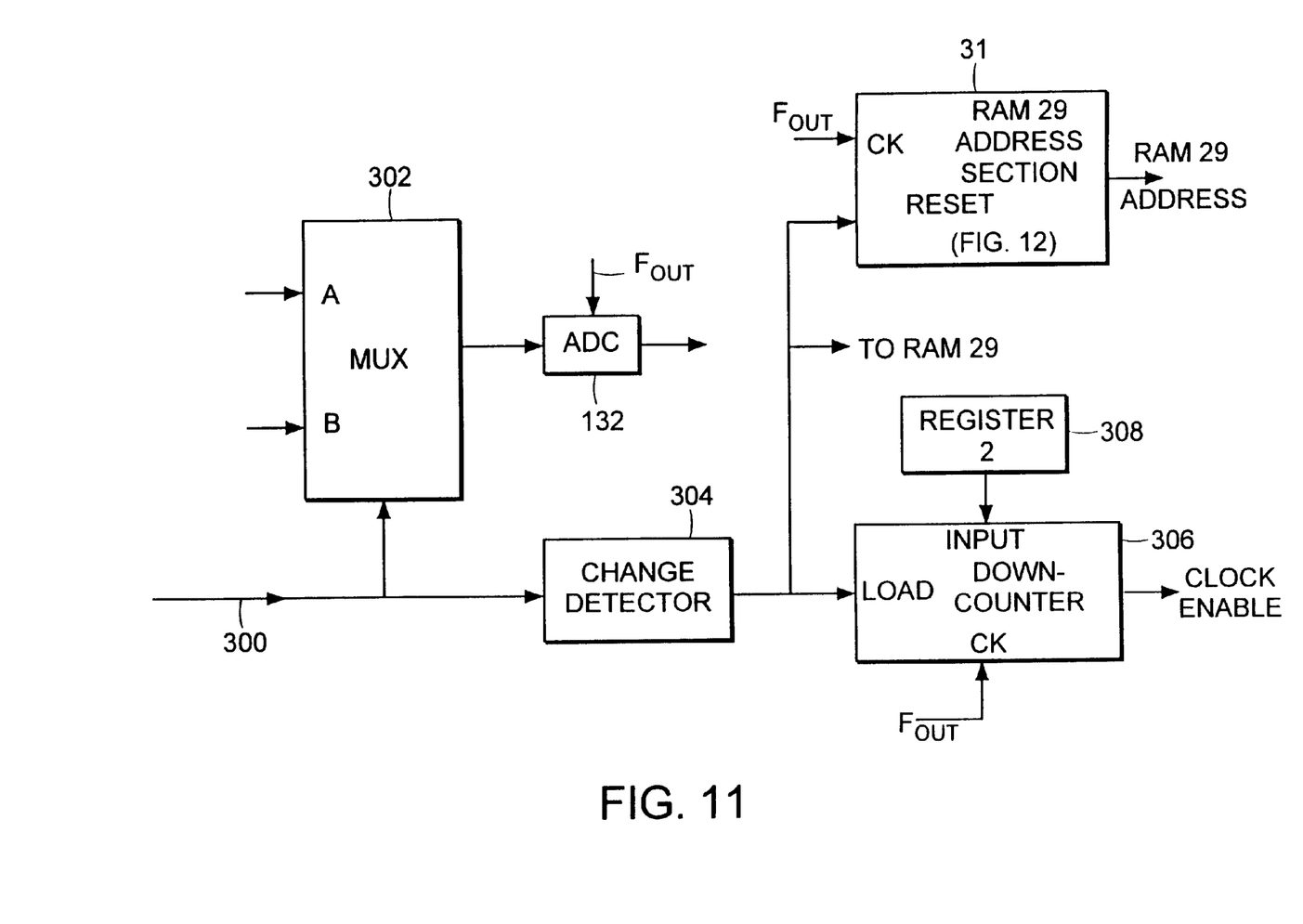
FIG. 11 is a block diagram of a clock disable circuit adapted for use with the digital filtering system of FIG. 1.

Referring now to FIG. 11, a circuit is shown for preventing outputs from being produced (by, in effect, disabling the clock 24 (FIG. 1)) until there have been a predetermined minimum number of samples produced by ADC 132 (FIG. 2). (Here, the disabling of clock 24 is effected by, during execution of the program stored in the program memory 14, examining the value of down-counter 306, to be described, and if it equals zero, then the program continues through the filter program execution while if it is not zero the computer program does not execute the filtering program sequence).

Here, digital samples are produced by ADC 132 at a rate, $f_{OUT}$. In response to a change on line 300, an event change detector 304 included in the selector section 19 (FIG. 1) produces a LOAD signal for down-counter 306. (The change on line 300 may be caused from, for example, "power-up" of the analog to digital conversion system of FIG. 2 or when the ADC 132 is to receive an input from a different channel (i.e., A or B) via a change in a control signal on line 300 to multiplexer 302; hereinafter collectively referred to as an event). In response to such LOAD signal, i.e., the detected event, counter 306 is preset to the value stored in register 308. The value in register 308 represents the number of samples which must be produced by the ADC 132 after the detected changed condition by event detector 304 before enablement of clock 24. Thus, here register 308 stores a value 2 and the clock 24 (FIG. 1) will be enabled only after 2 samples have been produced by ADC 132.

Figure 12:
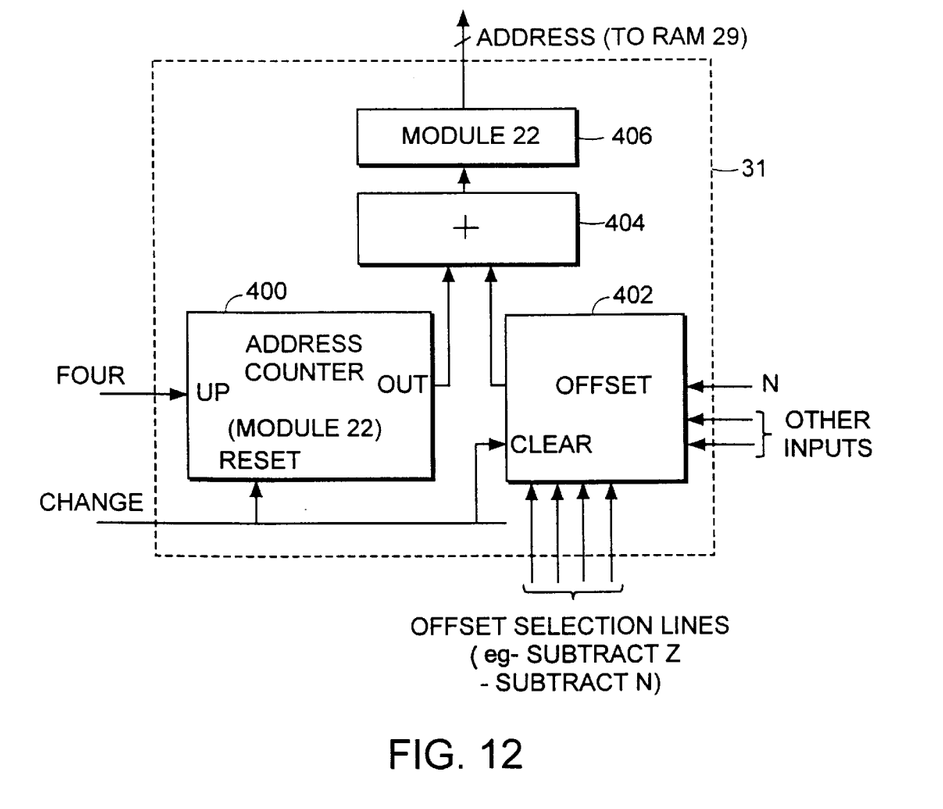
FIG. 12 is a block diagram of an address section used in the filtering system of FIG. 1.

More particularly, and referring also to FIG. 12, the RAM 29 address section 31 includes an address counter 400, an address offset section 402, an adder 404 fed by the outputs of the counter 400 and address offset section 402, and a "modulo 22" arithmetic 406 fed by the adder 404 for producing the addresses for RAM 29 (FIG. 1). In operation, counter 400 provides "base" address for the RAM 29. The counter 400 is incremented in response to each new sample fed to the filter 12 (FIG. 1). Counter 400 operates modulo-22. That is, when the contents of counter 400 reaches 22, the contents are reset to 0 and the process repeats. Therefore, the outputs produced by counter 400 are 0, 1, 2, . . . 21. It is also noted that the output of event change detector 304 (FIG. 11) is fed to the reset input of counter 400.

Offset section 402, in response to signals fed thereto during execution of the program stored in program memory 14, provides an output which is to be added or subtracted from the "base" address provided by the counter 400 in adder 404. The amount to be added or subtracted varies depending on whether the low bandwidth filter 16 (FIG. 1) or the wide bandwidth filter 18 is being used to provide the filter 12 (FIG. 1) output. For example, offset section 402 produces an offset address of −2 to extract data from a RAM 29 location 2 previous to the current address as where the second previous sample, $S_{n-m}$ is to be subtracted from the current sample, $S_n$, where m=2, in comparator section 22 (FIG. 1). Thus, the offset network produced −2 is added to the "base" address produced by counter 400, to provide the address for RAM 29.

Considering now the operation of the address section 31 in connection with the event change detector 304 (FIG. 11), here samples occurring prior to a detected event change by change detector 304 are indicated by $S_q$, $S_{q-1}$, $S_{q-2}$ . . . and samples occurring after a detected event change by change detector 304 are indicated, as discussed above in connection with FIGS. 4 and 5A–5E, $S_1$, $S_2$, . . . $S_{n-1}$, $S_n$. Thus, considering a first input $S_q$ occurring before the change occurs on line 300 for multiplexer 302 (FIG. 11). The RAM address section 31 writes sample $S_q$ into some address "p". After writing such sample $S_q$ into address "p", the write address (i.e., counter 400, is incremented to an address "p+1". The comparison section 22 (FIG. 1) operates to compute $\Delta=|S_{q-2}-S_q|$ and produce a signal on line 33 in accordance with the relationship between Δ and Δ$_{THRESHOLD}$, as described above.

When an event is detected by the change detector 304, here a change in the channel selected by the control signal on line 300, the RAM 29 in response to the event detect signal produced by detector 304 presets the data in all RAM 29 locations to a predetermined default value. The predetermined value is sufficiently smaller than the values expected for the samples to be fed to the digital filtering system 10 minus ΔTHRESHOLD, for reasons to be discussed. Further, the detected event initializes the RAM address counter 400 (FIG. 12) to 0 and causes counter 306 (FIG. 11) to be initialized to 2, as described above, to disable clock 24 (FIG. 1). It is also noted that because the clock 24 is disabled, the comparison section 22 (FIG. 1) is set to 0 and no comparison is performed.

The first sample after the channel change, $S_1$, then arrives. This sample is written into RAM location 0. The other RAM locations are still at the default value. The counter 306 is decremented to 1, however the clock 24 is still disabled so again no comparison is performed by section 22. There is no output produced by the digital filtering system 10 because the clock 24 is disabled. The next sample, $S_2$, arrives and is written into RAM location 1. Counter 306 is decremented to 0, re-enabling the clock 24. A comparison is therefore performed by section 22 as described above in connection with FIGS. 4 and 5A–5E between the current sample, $S_2$ and the sample two previous. This is achieved by reading from the current RAM 29 (i.e. location (1) from counter 400) and subtracting the data from the location 2 previous; (i.e., location (1-2=-1) by offset section 402 and adder 404). Thus, modulo 406 produces an address 21, i.e., the last location in RAM 29. The comparison is therefore performed between the contents of location 1 and the contents of location 21 (i.e., between sample $S_2$ and the predetermined default value. Because the default value is smaller than the smallest expected sample to be fed to the filtering system minus Δ$_{THRESHOLD}$, the comparison result performed by section 22 will always result in an indication that the threshold Δ$_{THRESHOLD}$ has been exceeded. Therefore, the averaging factor, N, and average remaining counter 210 (FIG. 1A) are initialized as described above in connection with FIG. 1A and the wide bandwidth filter 18 is selected, as described above. An average by two is performed on samples $S_1$ and $S_2$. The first output after the channel change by multiplexer 302 is therefore produced after two input samples.

The next sample $S_3$ then arrives and is written into RAM location (2). Counter 306 is still 0 so that the clock 24 is enabled. A comparison is made in section 22 between sample $S_1$ and sample $S_3$. The result of this comparison will depend on the levels of such samples as described above. The process continues and eventually all locations in RAM 29 will have data written into them so that the "base" address produced by counter 400 will wrap-around to 0 and sample $S_1$ will be overwritten with new data. Thus, the wide bandwidth filter having variable bandwidth 18 is selected in accordance with the time rate of change in the level of the input signal or a detected event.

As more input samples are acquired, the bandwidth of the wide bandwidth filter will reduce, provided the input samples remain within a threshold of each other, until the low bandwidth digital filter 16 is selected, as described above. Thus, once the comparison section 22 indicated that the threshold Δ$_{THRESHOLD}$ has been exceeded either because of the time rate of change in actual samples fed to the filtering system or by an change in event which provides data to the comparison section 22 indication that the threshold Δ$_{THRESHOLD}$ has been exceeded the action of the selection section 19 proceeds as described above in connection with FIGS. 4 and 5A–5E. That is, the variable bandwidth filter processes the input signal with a varying bandwidth, the bandwidth being relatively wide in response to a relatively high time rate of change in the level of the input signal or the detected event and then reducing to a lower bandwidth once the time rate of change is relatively low.

The digital filtering system 10 can therefore produce a correct output after only two input samples after an event, while a standard 22 coefficient FIR could require 22 input samples after an event before producing a correct output.

Other embodiments are within the spirit and scope of the appended claims. For example, the wide bandwidth filter 18 need not be variable in bandwidth but may be a filter with a fixed number of coefficients. If a variable filter is used, other averages may be used, for example, 1, 2, 3, 4, . . . 22. Further, a status bit, from the "step change" flag, may be provided to indicate whether the input is settled or not. Still further, the digital filtering system 10 may take differences between successive samples (i.e., m−1) in applications where chopping is not used and may also use an initial averaging factor, N, of 1 and average remaining of 0, in response to a step.

What is claimed is:

1. A digital filtering system for filtering samples of a input signal fed thereto, comprising;

a moving average filter having a variable averaging factor N;

a control section for varying the variable averaging factor N in accordance with a determined difference in level between a pair of the samples relative to a threshold level, the averaging factor N being $N_0$ when the determined difference is greater than the threshold level and is then successively increased once the determined difference is less than the threshold level.

2. The system recited in claim 1 wherein $N_0$ is 2.

3. The system recited in claim 2 wherein N is successively increased by factors of 2 to $2^i$ once ($2^i-1$) samples have been fed to the digital filter with the determined difference less than the threshold level.

4. The system recited in claim 1 wherein No is 1.

5. The system recited in claim 4 wherein N is successively increased by factors of 2 to $2^i$ once ($2^i-1$) samples have been fed to the digital filter with the determined difference less than the threshold level.

\* \* \* \* \*